United States Patent [19]
Anand et al.

[11] Patent Number: 5,779,768
[45] Date of Patent: Jul. 14, 1998

[54] RECOVERY OF VOLATILE ORGANIC COMPOUNDS FROM GAS STREAMS

[75] Inventors: Madhu Anand, Allentown; Shivaji Sircar, Wescosville; Augustine Ivanhoe Dalton, Macungie, all of Pa.

[73] Assignee: Air Products and Chemicals, Inc., Allentown, Pa.

[21] Appl. No.: 619,846

[22] Filed: Mar. 19, 1996

[51] Int. Cl.⁶ ............................................. B01D 53/047
[52] U.S. Cl. .............................. 95/99; 95/105; 95/106; 95/115; 95/141; 95/142
[58] Field of Search ................... 95/99, 104–106, 95/114, 115, 141–143, 147, 148

[56] References Cited

U.S. PATENT DOCUMENTS

| | | | |
|---|---|---|---|
| 2,642,955 | 6/1953 | Huntington et al. | 95/99 X |
| 2,747,681 | 5/1956 | Schuftan et al. | 95/99 X |
| 3,085,379 | 4/1963 | Kiyonaga et al. | 55/23 |
| 3,149,934 | 9/1964 | Martin | 55/58 |
| 3,225,518 | 12/1965 | Skarstrom et al. | 95/105 X |
| 3,282,647 | 11/1966 | Skarstrom et al. | 95/99 X |
| 3,527,024 | 9/1970 | McMinn et al. | 95/115 |
| 3,534,529 | 10/1970 | Mattia | 55/62 |
| 3,632,504 | 1/1972 | Barrere, Jr. et al. | 95/115 X |
| 4,043,770 | 8/1977 | Jakob | 95/115 X |
| 4,104,039 | 8/1978 | Kuri et al. | 55/23 |
| 4,203,734 | 5/1980 | Winter et al. | 55/26 |
| 4,231,764 | 11/1980 | Mattia | 55/28 |
| 4,409,006 | 10/1983 | Mattia | 95/141 X |
| 4,414,003 | 11/1983 | Blaudszun | 95/141 X |
| 4,421,532 | 12/1983 | Sacchetti | 55/28 |
| 4,480,393 | 11/1984 | Flink et al. | 34/27 |
| 5,198,001 | 3/1993 | Knebel et al. | 55/28 |
| 5,312,477 | 5/1994 | Minor | 95/105 X |
| 5,415,682 | 5/1995 | Zarchy et al. | 95/105 X |
| 5,503,658 | 4/1996 | Zarchy et al. | 95/99 |
| 5,547,491 | 8/1996 | Berwian et al. | 95/143 X |

FOREIGN PATENT DOCUMENTS

| | | | |
|---|---|---|---|
| 53-053581 | 5/1978 | Japan | 95/104 |

OTHER PUBLICATIONS

Spivey, J. J., "Recovery of Volatile Organics from Small Industrial Sources", Environmental Progress, vol. 7, No. 1, p. 39 (Feb., 1988).

Primary Examiner—Robert Spitzer
Attorney, Agent, or Firm—John M. Fernbacher

[57] ABSTRACT

A condensable component present at low concentration in a feed gas mixture containing the condensable component and a noncondensable component is recovered by selective adsorption from the feed gas mixture in an adsorption step, the resulting adsorbed condensable component is desorbed by a heated purge gas in a regeneration step to yield a purge gas effluent enriched in desorbed condensable component, and the purge gas effluent is cooled to condense and recover the condensable component as a liquid. An improvement comprises, during a time period of the regeneration step in which the concentration of the condensable component in the purge gas effluent reaches a maximum value, (a) dividing the purge gas effluent into a first and a second portion, (b) cooling the first portion of the purge gas effluent to a temperature sufficient to condense substantially all of the condensable component present therein and recovering the resulting condensate therefrom, and (c) cooling a second portion of the purge gas effluent and combining the resulting cooled gas stream with the feed gas mixture to yield a total feed mixture for the adsorption step.

19 Claims, 2 Drawing Sheets

5,779,768

RECOVERY OF VOLATILE ORGANIC COMPOUNDS FROM GAS STREAMS

TECHNICAL FIELD OF THE INVENTION

This invention pertains to the removal and recovery of condensable compounds from gas streams, and in particular to an integrated adsorption, fractionated desorption, and condensation method for removal and recovery of these compounds.

BACKGROUND OF THE INVENTION

The removal of volatile organic compounds (VOCs) from air and other low-boiling carrier gases is an important process in many industries to meet environmental regulations and to recover valuable compounds for reuse. These industries utilize VOCs in a wide variety of manufacturing steps including coating, dry cleaning, spray painting, printing, textile finishing, and polymer processing; most VOCs are organic solvents. When present in the carrier gas at concentrations above about 5000 ppmv, VOCs can be recovered readily by condensation using mechanical refrigeration or cooling by liquid nitrogen. At lower concentrations, adsorption and condensation can be utilized in combination wherein VOCs are removed from a gas stream by selective adsorption on a solid adsorbent and recovered by condensation from the concentrated desorbed gas stream. The clean carrier gas stream is reused or discharged to the atmosphere.

A generic thermal swing adsorption (TSA) process combining adsorption with condensation is disclosed by J. J. Spivey in *Environmental Progress*, Vol. 7, No. 1, p. 39 (1988). For continuous operation of the VOC removal and recovery, two adsorbent beds are used, one adsorbing and the other being thermally regenerated to desorb the VOC with steam or a hot inert gas. The desorbed stream is enriched in VOC; the VOC is recovered by separating the water from the VOC (if steam stripped) or condensing the VOC from the non-condensable inert gas by cooling with water, refrigerant or cryogenic medium. The extent of cooling carried out is dependent on the amount of VOC that needs to be removed from the stream. VOC recoveries greater than 99% are achievable by cooling the VOC enriched stream to low temperatures (e.g. with liquid nitrogen); under these conditions, the refrigeration costs can be high. The recovery of the VOC represents value either as a recycle product or fuel.

U.S. Pat. No. 3,085,379 describes a process for recovery of high purity gases (e.g. He, $H_2$) from streams containing other gaseous contaminants (e.g. air, $CH_4$) in the range of 1–10 mole %. The pressure swing adsorption (PSA) process involves selective adsorption of the contaminant on an adsorbent such as zeolitic molecular sieve from a pre-cooled high pressure gas stream while recovering the nonadsorbed purified gas at the feed pressure as the product. The process consists of two parallel beds in which one adsorbs and the other desorbs. The adsorbed contaminants and void gases are desorbed by reducing the bed pressure; part of the desorbed gas is recycled to the feed stream after necessary compression to feed pressure and the rest is discarded. The desorbed stream is partially discarded to prevent continuous buildup of the contaminants in the adsorption bed.

A cyclic PSA process is disclosed in U.S. Pat. No. 3,149,934 in which the feed is introduced at an elevated pressure at an intermediate point in the adsorption zone; a part of the primary effluent (purified, nonadsorbed species) is collected as product and the rest is refluxed to the desorption zone at a low pressure to facilitate desorption. A part of the secondary effluent from the desorption zone (enriched in the adsorbing species) is compressed and recycled to the bottom of the adsorption zone. Partial recycle of the secondary effluent allows increased recovery of the non-adsorbing gas product.

U.S. Pat. No. 3,534,529 describes a multi-adsorber process for the recovery of VOCs from air streams containing trace amounts of VOCs. The process consists of primary adsorbers which alternately operate in adsorption and desorption modes. Once an adsorber is saturated with the VOC, it is regenerated by using a heated recirculating stream of air and an inert gas. Once the bed is regenerated (in equilibrium with the recirculating gas at an elevated temperature), a slip stream enriched in VOC is removed from the recirculating regeneration gas, cooled and readsorbed on a smaller secondary adsorber to its bed saturation conditions. The secondary adsorber is stripped of the VOC with steam or other hot gas. The concentration of the VOC in the regeneration stream from the secondary adsorber is greater than that from the primary adsorber. The VOC is recovered from the highly enriched stream from the secondary adsorber. Enrichment by a factor of 20 over the feed to the primary adsorber is cited. At least three adsorbers are required for continuous removal of VOCs in the described process.

A process for concentrating or liquefying a specified component of a gaseous mixture is described in U.S. Pat. No. 4,104,039 utilizing a multi-bed PSA process in which the enriched desorbate is completely recycled into the next adsorber by mixing with fresh feed. The recycling is continued until the desired concentration of the product to be removed is achieved at which point the desorbate is collected as a liquid or as a concentrated gaseous stream. The concentration range of the adsorbate in the fresh feed is from 0.1 to 10 mole %, and the operation is carried out at close to ambient temperature. The complete recycle is carried out for at least five cycles, preferably 50 adsorption-desorption cycles, and each adsorption step varies from 1 to 30 minutes. The adsorbate is recovered at high concentrations. Recovery of MEK and ammonia from nitrogen and air respectively are cited as examples.

U.S. Pat. No. 4,203,734 describes an adsorption process for purification of air streams containing impurities of different volatilities. Adsorbers are placed in series in such a manner that the first adsorber removes impurities of low volatility; the second adsorber is maintained at a lower temperature so that higher volatility VOCs that are not adsorbed on the first adsorber are removed in the second adsorber. The desorption is carried out with an inert gas or steam. This process also allows the recovery of individual components from each of the adsorbers.

A continuous recirculating fluidized bed adsorber system for the removal of organic contaminants from gas streams is disclosed in U.S. Pat. No. 4,231,764. The adsorbent material in the fluidized bed is treated in four stages. In stage 1, contaminants are adsorbed on the adsorbent; in stages 2 and 3, the high and low volatility components are stripped with hot regeneration gases; and in stage 4 the adsorbent is cooled and returned to the first stage. The regeneration gas may also be sent to a second adsorber system for increased enrichment.

U.S. Pat. No. 4,421,532 describes a low cooling duty VOC removal and recovery process from waste industrial gases. In this process, the VOCs are first adsorbed on an adsorbent and clean air is released to the environment. A hot inert regeneration gas is used for desorption, and the VOC-enriched stream is cooled to recover some of the VOC as a liquid. The rest of the cooled regeneration gas, still containing high VOC levels, is fed into an adsorber to produce an inert regenerating gas which is clean and available for regenerating another bed after heating. In this manner, the VOC is partially removed from the recirculating regenerating gas by cooling to moderate temperatures which reduces the cooling duty. This process requires an additional large adsorber to allow this closed loop readsorption step.

A combined adsorption and condensation process for the recovery of VOCs from contaminated air streams is described in U.S. Pat. No. 4,480,393. In the process described, the VOC-laden stream is cleaned by adsorbing the VOC on an activated carbon bed. The cleaned air is exhausted or recycled through the adsorber. The desorption is carried out with a mixture of air and an inert gas so as to lower the concentration of oxygen below 11%. The desorption of the VOC is done at an elevated temperature. The carbon adsorber is desorbed with a gas recirculating through the bed in the desorption mode. A part of the desorbed stream is sent to a condenser to recover the VOC. The carrier gas from the condenser is either exhausted or recirculated to the desorbing gas or returned to a carbon bed in the adsorbing mode. Streams with relatively high concentrations of VOCs greater than 3000 ppmv are shown in the examples.

U.S. Pat. No. 5,198,001 discloses a process which combines adsorption and thermal oxidation for removal of VOCs from contaminated air streams. The adsorption of the VOCs is carried out in graded beds which contain particulates that can adsorb VOCs of different volatilities. The desorption is preferably done with a humid flue gas stream. The flue gas is generated by oxidizing the VOCs in an incinerator.

All of the above described processes are designed for removal of VOCs or other gaseous impurities from a gas stream in which the concentration of the contaminant is moderate to high (i.e. greater than 3000 ppmv).

As manufacturing processes are modified to improve utilization and reduce emissions of VOCs, the concentrations of residual VOCs in typical process carrier gas streams will become successively lower. The final removal of VOCs from these increasingly dilute gas streams in turn will become more expensive and energy intensive. There is a need for improved, energy-efficient methods to recover VOCs from these very dilute gas streams, particularly streams which contain less than about 1000 ppmv VOCs. The invention described below and defined in the claims which follow sets forth an improved method for VOC recovery from such gas streams.

SUMMARY OF THE INVENTION

The invention is a method for the recovery of one or more condensable components present at very low concentration (i.e. less than about 1000 ppmv) from a feed gas mixture containing the condensable components and one or more noncondensable component. The condensable component is recovered by passing the feed gas mixture through an adsorbent bed which selectively adsorbs the condensable component and withdrawing a noncondensable component product substantially free of the condensable component. When the adsorption capacity of the adsorbent bed for the condensable component is reached, the flow of the feed gas mixture to the adsorbent bed is terminated and feed gas mixture is passed through another adsorbent bed which selectively adsorbs the condensable component and produces a high purity noncondensable component product.

The condensable component adsorbed by the adsorbent bed is desorbed by passing a purge gas through the adsorbent bed at a temperature above the adsorption temperature, and a purge gas effluent enriched in desorbed condensable component is withdrawn. The adsorbent bed preferably is heated to the purge temperature by heating the purge gas prior to introduction into the adsorbent bed. The purging of the adsorbent bed may be carried out in a flow direction countercurrent to that of the feed gas mixture in the adsorption step.

During the first period of the purge step, at least a portion of the purge gas effluent is cooled and combined with the feed gas mixture passing to the other adsorbent bed. During the second period of the purge step, concurrently a first portion of the purge gas effluent is cooled to yield a cooled purge gas effluent and a second portion of the purge gas effluent is cooled to a temperature sufficient to condense substantially all of the condensable component present therein. The resulting condensate is separated from the resulting cooled noncondensable gas. The cooled purge gas effluent is combined with the feed gas mixture to yield a total feed mixture which is passed to the other adsorbent bed. The flow of purge gas through the adsorbent bed is discontinued, the adsorbent bed is cooled, and then the adsorption and purge steps are repeated in a cyclic fashion. The cooling of the adsorbent bed may be accomplished by passing therethrough a portion of the high purity noncondensable component product, and the cooling gas flow may be in a direction countercurrent to that of the feed gas mixture in the adsorption step.

Optionally, in a third period following the second period of the purge step, at least a portion of the purge gas effluent is cooled to a temperature sufficient to condense substantially all of the condensable component present therein, and the resulting condensate is separated from the resulting cooled noncondensable gas. Alternatively, at least a portion of the purge gas effluent is cooled and combined with the feed gas mixture to yield a total feed mixture which is passed to the other adsorbent bed. Optionally, the cooled noncondensable gas after condensate separation is combined with the cooled purge gas effluent and the feed gas mixture to yield a total feed mixture which is passed to the other adsorbent bed. During this third time period, a portion of the purge gas effluent optionally is vented to the atmosphere.

Preferably, during the second period of the purge step, the molar flow ratio of the first portion of purge gas effluent to the second portion of purge gas effluent is between about 0.1 and about 0.9. The ratio of the molar concentration of the condensable component in the total feed mixture (which feeds the adsorber) to the molar concentration of the condensable component in the feed gas mixture (i.e. fresh feed) is greater than about 1.5.

The second period of the purge step is defined as that period of time during which the concentration of the desorbed condensable component in the purge gas effluent reaches a maximum value. The first period of the purge step is defined as that period of time in which the concentration of the desorbed condensable component in the purge gas effluent is less than the concentration of the desorbed condensable component in the purge gas effluent at any time during the second period of the purge step. In addition, the third period of the purge step is defined as that period of time in which the concentration of the desorbed condensable component in the purge gas effluent is less than the concentration of the desorbed condensable component in the purge gas effluent at any time during the second period of the purge step. The first, second, and third periods of the purge step occur sequentially.

At least a portion of the purge gas to the adsorbent bed is provided by a portion of the high purity noncondensable component product from the other adsorbent bed. During regeneration, the adsorbent bed is heated to a temperature above the adsorption temperature by heating the purge gas prior to introduction into the bed.

An alternative definition of the invention is as follows. In a known process for the recovery of a condensable component present at low concentration from a feed gas mixture containing the condensable component and a noncondensable component, wherein the condensable component is selectively adsorbed from the feed gas mixture in an adsorption step, the resulting adsorbed condensable component is desorbed by a heated purge gas in a regeneration step to yield a purge gas effluent enriched in desorbed condensable component, and the purge gas effluent is cooled to condense and recover the condensable component as a liquid. In the present invention, the processing of the purge gas effluent is improved during a time period of the regeneration step in which the concentration of the condensable component in the purge gas effluent reaches a maximum value. The improvement of the invention comprises (a) dividing the purge gas effluent into a first and a second portion; (b) cooling the first portion of the purge gas effluent to a temperature sufficient to condense substantially all of the condensable component present therein and recovering the resulting condensate therefrom; and concurrently (c) cooling the second portion of the purge gas effluent and combining the resulting cooled gas stream with the feed gas mixture to yield a total feed mixture for the adsorption step.

DETAILED DESCRIPTION OF THE INVENTION

The present invention is an efficient integration of adsorption, fractionated desorption, and condensation for the recovery of low concentrations of volatile organic compounds (VOCs) from a carrier gas such as air or nitrogen wherein the concentration of these volatile compounds is typically less than about 1000 ppmv. In its most general embodiment, the invention is useful for recovering any adsorbable and condensable components from a diluent or carrier gas which is significantly less adsorbable and is essentially noncondensable at the process conditions of interest.

Figure 1:
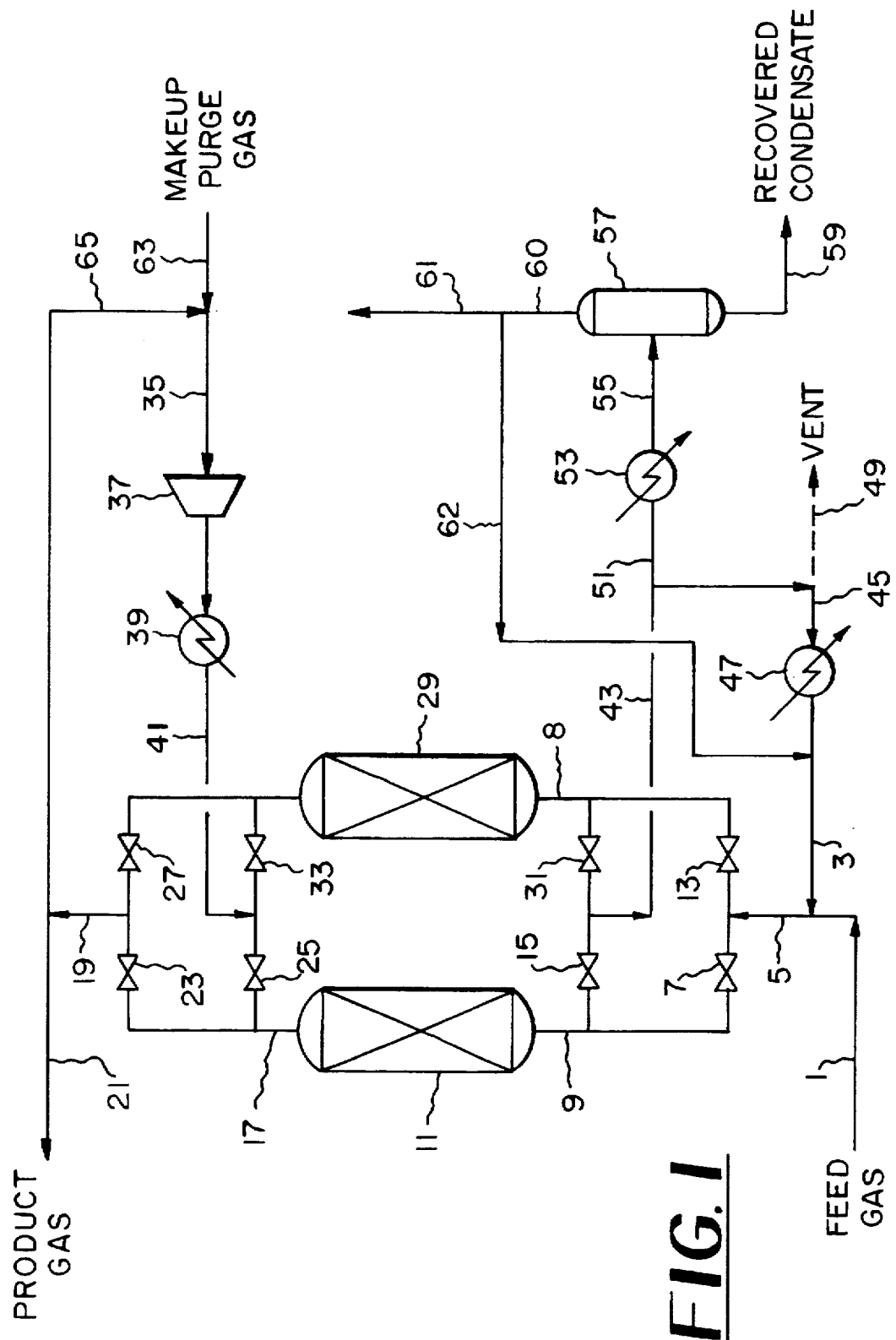
FIG. 1 is a simplified process flow diagram of the adsorption-fractionated desorption-condensation method of the present invention.

The invention is illustrated in the process flow diagram of FIG. 1. Feed gas 1 (i.e. fresh feed) comprises a diluent gas of one or more low-boiling components containing one or more components present at very low concentrations which are condensable at temperatures far above the condensation temperature of the diluent gas. In the present invention, the diluent gas is considered noncondensable at the condensation temperatures described below, and the other components are defined as condensable components. In addition, the condensable components are adsorbed strongly and selectively from the vapor phase on adsorbent materials while the components of the diluent gas are adsorbed only slightly by the adsorbent at the process temperatures of interest as described later. Representative diluent gases include nitrogen, air, hydrogen, helium, argon, and other inert gases. The inertness of a diluent gas is defined in terms of its adsorptivity on the adsorbent, and any gas which is very slightly adsorbed on the adsorbent compared to the condensable components is defined as a diluent or inert gas. For the purposes of this disclosure, the terms inert gas, diluent gas, and carrier gas have equivalent meaning. The ratio of the adsorption capacity of a condensable component to the adsorption capacity of the diluent gas, each determined at the mixture adsorption conditions, should be greater than about 3.0 and preferably greater than about 10.0.

The condensable components can be any of a large group of compounds, typically organic compounds, which are used as solvents or reactants in a wide variety of industrial processes. These are defined in the art as volatile organic compounds, or VOCs, although the condensable components of the present invention also can include inorganic compounds. Condensable components can be present in feed gas 1 at concentrations up to about 1 vol %. However, the method of the present invention has particular utility for recovering condensable components present in feed gas 1 at very low concentrations below about 1000 ppmv (0.1%). In certain applications of the invention only a single condensable component is present in feed gas 1; in other applications, two or more condensable components will be present. In the description which follows, a single condensable component is used for illustration purposes.

Feed gas 1 optionally is combined with fractionated recycle stream 3 (later defined) to form total feed gas 5 which passes through open valve 7 to provide adsorber feed gas 9 to adsorber vessel 11. Valves 13 and 15 are closed at this time. Adsorber feed gas 9 is typically at ambient temperature (5° to 50° C.) and a pressure between 14.7 and 30 psia. Adsorber vessel 11 operates at or near ambient temperature and contains granular adsorbent material which selectively adsorbs the condensable component and only very weakly adsorbs the diluent components in the presence of the condensable components in the feed gas 9. The adsorbent is selected from any of the many commercially available materials such as activated carbons, zeolites, silica gels and activated aluminas. For many organic condensable components, activated carbon is the preferred adsorbent.

Adsorber effluent gas 17 is withdrawn from adsorber 11 and contains high purity diluent gas with less than about 0.1 to about 10 ppmv of condensable component; the purified diluent gas 19 is withdrawn as final purified diluent or product gas 21. This final product gas is considered herein to be substantially free of the condensable component when the component concentration is less than about 0.1 to about 10 ppmv. At this time valve 23 is open and valves 25 and 27 are closed. Adsorber feed gas 9 flows through adsorber 11 until the adsorbent working capacity approaches exhaustion, which is indicated by a rising concentration of the condensable component in adsorber effluent gas 17. This condition is commonly known as breakthrough. When the concentration of the condensable component in adsorber effluent gas 17 reaches a predetermined value (typically less than about 0.1 to 10 ppmv) the flow of adsorber feed gas 9 is discontinued and the adsorber is isolated by closing valves 7 and 23. The duration of the adsorption step depends chiefly on the concentration of the condensable component and the flow rate of the feed gas in adsorber feed gas 9 and typically is between 1 and 48 hours. The flow of feed gas 5 is switched to adsorber 29 by opening valves 13 and 27 to provide adsorber feed gas 8, valves 31 and 33 remain closed, and purified diluent gas 19 is withdrawn as final purified product gas 21. Adsorber 29 is identical to adsorber 11 and contains freshly regenerated adsorbent, having just completed a desorption cycle as described below with reference to adsorber 11.

The regeneration of adsorber 11 is initiated by compressing purge gas 35 (described later) to a pressure of 15 to 20 psia in compressor or blower 37 (if the gas is available at a lower pressure) and heating the gas to 100° C. to 300° C. in heater 39. Valves 15 and 25 are opened, heated purge gas 41 is passed countercurrently through adsorber 11, and purge gas effluent 43 is withdrawn. The concentration of the condensable component in purge gas effluent 43 varies with time as desorption occurs during the regeneration step.

Figure 2:
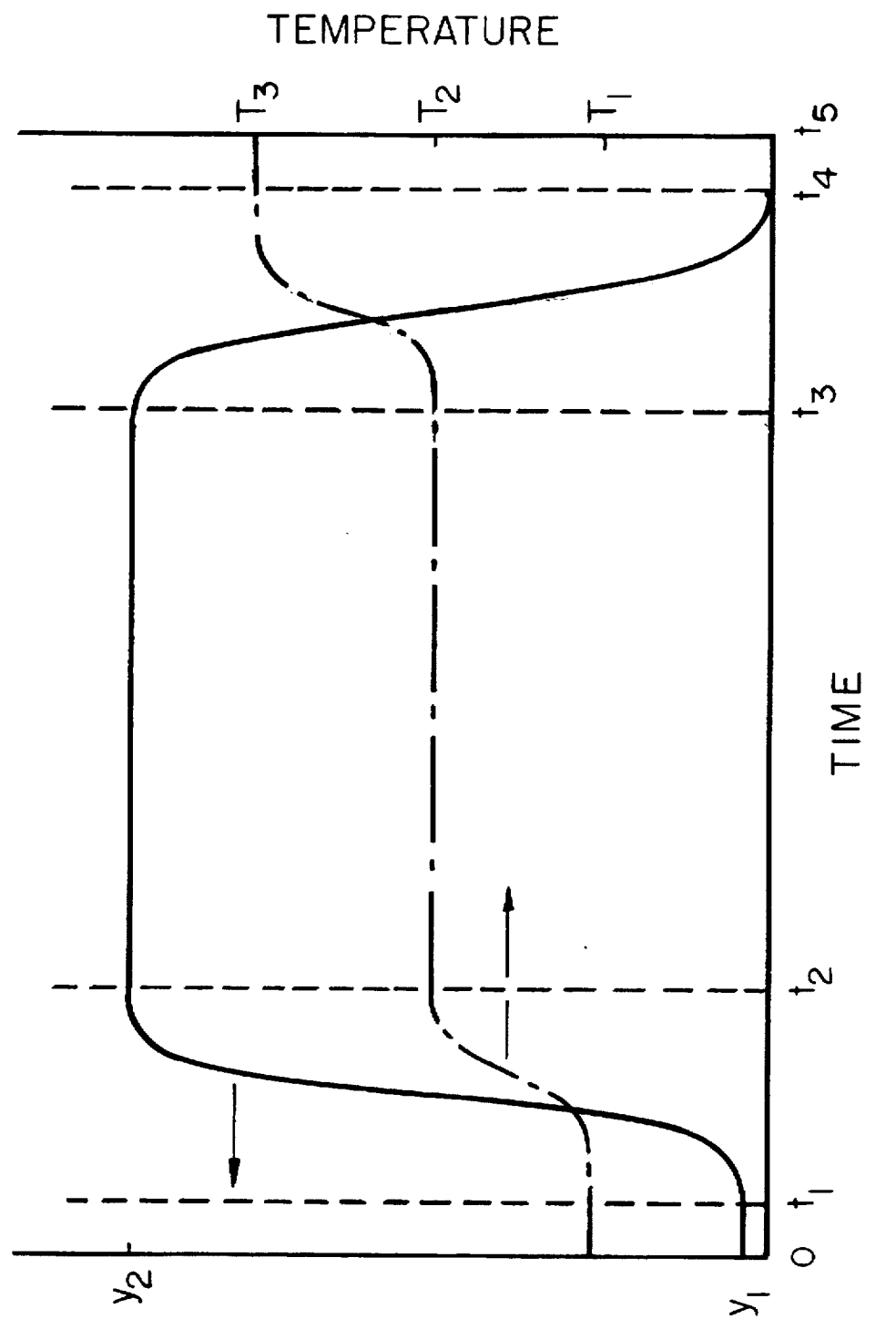
FIG. 2 is a generalized plot of the concentration profile and the temperature profile of the effluent purge gas during the purge step of the present invention.

A typical profile of the purge gas concentration vs. time for the regeneration step for a single condensable component is given by the solid curve in FIG. 2. The regeneration step proceeds through the following time periods:

1. During the initial period between time zero and $t_1$, void space gas is discharged as purge gas effluent 43 having a condensable component concentration of $y_1$, which is essentially equivalent to the concentration of the condensable component in total feed gas 9. Desorption then proceeds, and as the initial desorption mass transfer zone reaches the end of the adsorber, the condensable component concentration rises during period $t_1$ to $t_2$ from $y_1$ to $y_2$. During the period between time zero and time $t_2$, purge gas effluent 43 is either cooled and condensed in cooler 53 and separated in separator 57 as described above, or is cooled in cooler 47 and recycled to the adsorber as described above. Optionally, a portion 49 of purge gas effluent can be vented if the concentration is sufficiently low.

2. After the initial desorption mass transfer zone exits the adsorber, the concentration of the condensable component remains at or near a maximum of $y_2$ during time period $t_2$ to $t_3$ during which the desorption equilibrium zone reaches and exits the end of the adsorber. Enriched purge gas effluent 43 is divided into portion 45, which is cooled in cooler 47 to provide recycle gas 3, and remaining portion 51, which is cooled to −150° C. to +30° C. in condenser 53. Cooling of portion 45 condenses substantially all of the condensable component, which is separated in separator 57 to yield recovered condensate 59 and residual diluent gas 60. A very small concentration of condensable component will remain in residual diluent gas 60 based on the vapor pressure of the condensable component at the temperature in separator 57. The condensation of substantially all of the condensable component means by definition herein that the component is condensed except for a residual amount which remains in the vapor phase at equilibrium due to the component vapor pressure.

Residual diluent gas 60 can be discharged as vent stream 61 or recycled to the adsorber feed as recycle stream 62. Preferably, purge gas effluent 43 is divided such that the molar flow ratio of portion 45 (recycled) to portion 51 (to condensation) is between about 0.1 and about 0.9. Increasing this recycle ratio between streams 45 and 51 will increase the concentration of the condensable component in total feed gas 5 to the adsorption step and in purge effluent 51 to condenser 53. Typically this molar flow ratio is selected such that the molar concentration ratio of the condensable component in total feed gas 5 to that in feed gas 1 is between about 1.5 and 20.

3. After the major portion of the equilibrium desorption step reaches completion at about time $t_3$, the concentration of the condensable component during time period $t_3$ to $t_4$ decreases from $y_2$ to a level approaching the concentration of the condensable component in heated purge gas 41 as the final desorption mass transfer zone reaches the end of the adsorber. During this period, purge gas effluent 43 is either cooled and condensed in cooler 53 and separated in separator 57 as described above, or is cooled in cooler 47 and recycled to the adsorber as described above. Optionally, a portion 49 of purge gas effluent can be vented if the concentration is sufficiently low.

4. Finally, during time period $t_4$ to $t_5$ the concentration of the condensable component in purge gas effluent 43 decreases further. The final concentration of the condensable component in purge gas effluent 43 at time $t_5$ is essentially the composition of the condensable component in heated purge gas 41, and this final concentration of the condensable component depends on the source of purge gas 35 as discussed below. Typically, purge gas effluent 43 is vented as purge gas effluent 49 during this time period.

Fractionated recycle is defined as the cooling and recycling of a portion of the purge effluent to the adsorber feed simultaneously with the condensing and recovery of condensable components from the remaining portion of the purge effluent or venting the remaining portion of the purge effluent.

The regeneration step can be terminated at any time during the latter part of time period $t_3$ to $t_4$ or during time period $t_4$ to $t_5$, depending on the required concentration of the condensable component in product diluent gas 21 and the acceptable time to breakthrough during the subsequent adsorption step. At the completion of regeneration, the adsorber can be cooled for the next adsorption step by continuing the flow of purge gas 41 while discontinuing heating in heater 39 or bypassing heater 39 (not shown). Alternatively, purge gas obtained from an external source can be used in countercurrent flow to cool the adsorber. After the adsorber is cooled, valves 15 and 25 are closed and the flow of adsorber feed gas 9 is initiated by opening valves 7 and 23. The adsorption cycle described above is then repeated. At the initiation of the adsorption step using adsorber 11, adsorber 29 (which had been in the adsorption mode during the regeneration of adsorber 11) is regenerated in a series of steps analogous to the above description for the regeneration of adsorber 11. The adsorption and regeneration steps are preferably carried out at pressures slightly above atmospheric. Repressurization of an adsorber to the feed gas pressure level at the beginning of an adsorption step, when necessary, is accomplished by the introduction of adsorber feed gas 8 or 9.

Thus adsorbers 11 and 29 operate in parallel, with one adsorber in the adsorption mode and the other in the regeneration or purge mode. Additional pairs of parallel adsorbers can be used if necessary to process higher flow rates of feed gas.

Purge gas 35 can be provided by portion 65 of product gas 21, makeup gas 63, or a combination thereof. Residual diluent gas 61 is at −150° C. to +30° C., the temperature of separator 57, and the refrigeration available in this gas preferably is used to precool purge gas effluent 51 and/or purge gas effluent 45 by indirect heat exchange (not shown).

If the noncondensable component in feed gas 1 is air and the condensable component is flammable in air, an inert purge gas is used during at least a portion of the purge step to avoid forming a flammable gas mixture in purge gas effluent 43. In such a situation, makeup purge gas 63 is an inert gas such as nitrogen, and provides all of purge gas 35 from the start of the purge step until the concentration of the condensable component in purge gas effluent 43 is at a concentration safely below the lower flammability limit in air. For the remainder of the purge step, purge gas 35 can be air or a portion 65 of purified diluent gas 19.

FIG. 2 also gives the time vs. temperature profile of purge gas effluent 43 for the single condensable component case.

The temperature profile, given by the dashed curve, indicates that the initial temperature of the purge gas effluent is $T_1$, which is the temperature of the void space gas in adsorber 11. The temperature then begins to rise as the hot regeneration gas reaches the end of the adsorber, and stabilizes at an intermediate temperature $T_2$ as desorption occurs during time period $t_2$ to $t_3$. During this period the endothermic desorption process maintains the gas temperature below that of hot purge gas 41. During exit of the final mass transfer zone from the adsorber in time period $t_3$ to $t_4$ the purge gas effluent temperature begins to rise, and eventually reaches $T_3$ which is the temperature of hot regeneration gas 41.

The desorption profile of FIG. 2 is typical for a single condensable component. The actual shape of the curve may differ between different condensable components, but the general characteristics of the curve will be the same. If more than one condensable component is present in feed gas 1, the desorption profile will be somewhat different and may not be symmetrical with time, but will have the common general characteristics of FIG. 2. These general characteristics include the existence of three major time periods during desorption as defined in FIG. 2: (1) time zero to $t_2$ during which the initial desorption mass transfer zone exits the adsorber; (2) $t_2$ to $t_3$ during which the desorption equilibrium zone reaches and exits the end of the adsorber; and (3) $t_3$ to $t_4$ during which the final desorption mass transfer zone reaches the end of the adsorber. The concentration of the condensable component in purge gas effluent 43 at any time during zero to $t_2$ and at any time during $t_3$ to $t_4$ is less than the condensable component concentration in the purge gas effluent at any time during $t_2$ to $t_3$. The time period $t_2$ to $t_3$ is defined as that time period during which the concentration of the condensable component in the purge gas effluent reaches a maximum value.

The essential feature of the present invention which differs from prior art teaching is the specific method of processing purge gas effluent 43 during each of these three desorption time periods and in particular during time period $t_2$ to $t_3$. According to the invention, during time zero to $t_2$ at least a portion of the purge gas effluent is recycled to the adsorber feed; during $t_2$ to $t_3$ a selected portion of the purge effluent is recycled to the adsorber feed and the remainder is cooled to condense the condensable component for recovery; and during $t_3$ to $t_4$ either at least a portion of the purge effluent is recycled to the adsorber feed or at least a portion of the purge effluent is cooled to condense the condensable component for recovery.

EXAMPLE 1

Butane is recovered by adsorption at 50° C. on type BPL activated carbon in adsorber 11 (FIG. 1) from an air feed gas 1 containing 25 ppmv butane. The air feed gas is supplied at slightly above atmospheric pressure to allow for pressure drop in adsorber 11 and related piping at a flow rate of 10 million standard feet per day (mmscfd). Product gas 21 is withdrawn containing less than 5 ppmv butane. When the adsorption step is complete as indicated by breakthrough of butane in product gas 21, adsorber 11 is isolated and regenerated as earlier described by countercurrent purge with nitrogen at 130° C. Purge gas effluent 43 is condensed at −129° C. in condenser 53 and no purge gas is recycled to the adsorber. This mode of operation is defined as straight thermal desorption; fractionated recycle is not used. Offgas 61 is vented and no product gas 65 is used for purging. 99% of the butane in feed gas 1 is recovered in purge effluent gas 43 which contains 2,235 ppmv butane at a flow rate of 0.23 mmscfd. Regeneration conditions for the equilibrium zone between $t_2$ and $t_3$ were calculated using the constant-pattern adsorption model described in S. Sircar and R. Kumar, *Equilibrium Theory of Adiabatic Desorption of Bulk Binary Gas Mixtures by Purge*, I&EC Proc. Des. & Dev., 24, 358 (1985). The calculated composition profile of purge gas effluent 43 is that of FIG. 2 where $y_1$ is 25 ppmv and $y_2$ is 2,235 ppmv butane. $T_1$ is 50° C., $T_2$ is 119° C., and $T_3$ is 130° C. Additional calculations for equilibrium zone conditions were performed for several different feed gas compositions to illustrate the degree of butane concentration in the desorbed gas, and the results are summarized below in Table 1.

TABLE 1

Calculated Adsorber Purge Gas Composition vs. Feed Concentration and Temperature for Butane as the Condensable Component (Straight Thermal Desorption)

| Feed, ppmv ($y_1$) | Purge Effluent Gas Composition, ppmv ($y_2$) | Temperature, °C. ($T_2$) |
|---|---|---|
| 25 | 2,235 | 119 |
| 50 | 3,463 | 111 |
| 100 | 5,215 | 108 |
| 200 | 7,620 | 99 |
| 500 | 11,549 | 81 |

These results illustrate the degrees of concentration which can be obtained in the effluent purge gas for butane adsorbed at a very dilute concentration from air and recovered by straight thermal desorption.

EXAMPLE 2

A heat and mass balance was carried out for the process of the present invention and the feed gas conditions of Example 1. The present Example includes the added feature of fractionated recycle in which a portion of purge effluent gas 43 is recycled to provide a portion of adsorber total feed gas 5. Feed gas 1 contains 25 ppmv butane and the adsorption cycle time is four hours (time zero to $t_5$ in FIG. 2); adsorption is carried out at 50° C. and regeneration is carried out at 130° C. The butane recovery is 99% for this Example.

An initial portion 45 of purge effluent gas 43 between time zero and $t_1$ (FIG. 2) is cooled and recycled to the adsorber. During the equilibrium desorption period $t_2$ and $t_3$, 75.4% of purge gas effluent 43 is cooled and recycled as cooled recycle gas 3 to provide adsorber total feed gas 5, and the remainder 51 is condensed at −122° C. to yield recovered condensate 59. By recycling a portion of purge gas effluent 43, the butane concentration in total adsorber feed gas 5 is increased to 100 ppmv. The desorption effluent gas between times $t_3$ and $t_4$ is not recovered.

A comparison of the calculated results for Example 1 (straight thermal desorption) and Example 2 for the present invention is given in Table 2.

TABLE 2

Comparison of Adsorber Operation With and Without Fractionated Recycle Example 1 vs Present Invention

| | Example 1 - Straight Thermal Desorption | Present Invention - Fractionated Recycle |
|---|---|---|
| Process Feed Gas 1, ppmv butane | 25 | 25 |
| Condenser Feed 51, ppmv butane | 2,235 | 5,215 |
| Adsorbent Charge, lb | 1,564 | 1,900 |
| Heat Duty, Heater 39, mmbtu/hr | 0.110 | 0.144 |

TABLE 2-continued

Comparison of Adsorber Operation
With and Without Fractionated Recycle
Example 1 vs Present Invention

|  | Example 1 - Straight Thermal Desorption | Present Invention - Fractionated Recycle |
|---|---|---|
| Cooling Duty, Coolers 47 and 53, mmbtu/hr | 0.136 | 0.057 |
| Total Heating and Cooling Duty, mmbtu/hr | 0.246 | 0.201 |

These results illustrate the benefits of concentrating the butane in the adsorber feed and the condenser feed by fractionated recycle of the purge gas effluent described by present invention. While the heat duty and adsorbent requirements are somewhat higher in the present invention case, the total cooling duty is significantly lower. As a result, the total energy requirement for the present invention is 18% lower than the straight thermal desorption case of Example 1. In using the fractionated recycle of the present invention; the size of adsorber bed 11 or 29 is increased by 21% and hence requires higher energy for butane desorption. However, the flow rate of purge gas effluent 53 to condenser 57 is decreased by 57% and the cooling temperature in the condenser is raised to −122° C. compared with −129° C. for straight thermal desorption of Example 1. This reduces the overall energy required for butane recovery.

EXAMPLE 3

The calculations of Example 1 were repeated for methylene chloride as the condensable component in which adsorption and desorption are carried out at 50° C. and 150° C. respectively, and condensation is accomplished at a temperature of −104° C. The results are summarized in Table 3.

TABLE 3

Calculated Adsorber Purge Gas Composition vs. Feed Concentration
with Methylene Chloride ($Me_2Cl_2$) as the Condensable Component
(Straight thermal desorption)

| Feed, ppmv ($y_1$) | Purge Effluent Gas Composition, ppmv ($y_2$) | Temperature, °C. ($T_2$) |
|---|---|---|
| 25 | 1,786 | 146 |
| 50 | 3,437 | 142 |
| 100 | 6,539 | 134 |
| 200 | 12,888 | 113 |
| 500 | 20,650 | 69 |

These results illustrate the degrees of concentration which can be obtained in the effluent purge gas with methylene chloride adsorbed from air.

EXAMPLE 4

The calculations and conditions of Example 3 were repeated for methylene chloride as the condensable component with the condensation step operated at −95° C. using the process concept of the present invention. The results comparing Examples 3 and 4 are summarized in Table 4. In this Example, 75.3% of purge effluent stream 43 is cooled in cooler 47 and recycled to feed 5 for adsorbers 11 and 29.

TABLE 4

Comparison of Adsorber Operation
With and Without Fractionated Recycle

|  | Example 3 (Straight Thermal Desorption) | Present Invention (Fractionated Recycle) |
|---|---|---|
| Process Feed Gas 1, ppmv $Me_2Cl_2$ | 25 | 25 |
| Condenser feed 51, ppmv $Me_2Cl_2$ | 1,786 | 6,539 |
| Adsorbent Charge, lb | 464 | 677 |
| Heat Duty, Heater 39, mmbtu/hr | 0.098 | 0.107 |
| Cooling Duty, Coolers 47 and 53, mmbtu/hr | 0.146 | 0.038 |
| Total Heating and Cooling Duty, mmbtu/hr | 0.244 | 0.145 |

These results illustrate the benefits of concentrating the methylene chloride in the adsorber feed and the condenser feed by partial or fractionated recycle of the purge gas effluent. While the total heat duty and adsorbent requirements are somewhat higher in the recycle case, the total cooling duty is significantly lower. As a result, the total energy requirement when using fractionated recycle is 41% lower than with straight thermal desorption. In this Example the size of adsorber 11 or 29 is increased by 46%. However, this is offset by a 74% decrease in the size of condenser 57, and the condenser temperature is raised to −95° C. for this invention vs. −104° C. for straight thermal desorption of Example 3.

The method of the present invention thus enables the energy-efficient recovery of volatile condensable components from noncondensable diluents such as air. Fractionated recycle of enriched purge gas effluent from the regeneration step reduces the overall energy consumption for recovering the condensable component. During the period of the highest concentration of the condensable component in the purge gas effluent, the purge gas effluent is divided such that the molar flow ratio of the portion recycled to the adsorber to the portion cooled and condensed is between 0.1 and 0.9. The proper selection of this ratio optimizes the overall process design and reduces the energy consumption for the recovery of the condensable component.

The essential characteristics of the present invention are described completely in the foregoing disclosure. One skilled in the art can understand the invention and make various modifications without departing from the basic spirit of the invention, and without deviating from the scope and equivalents of the claims which follow.

We claim:

1. A method for the recovery of one or more condensable components present at low concentration from a feed gas mixture containing the condensable components and one or more noncondensable components, said method comprising:
   (a) passing the feed gas mixture at an adsorption temperature through a first adsorbent bed which selectively adsorbs the condensable component and withdrawing therefrom a noncondensable component product substantially free of the condensable component;
   (b) terminating the flow of the feed gas mixture to the first adsorbent bed and passing the feed gas mixture through a second adsorbent bed which selectively adsorbs the condensable component and withdrawing therefrom a high purity noncondensable component product;

(c) desorbing the condensable component adsorbed in step (a) by passing a flow of purge gas through the first adsorbent bed at a temperature above the adsorption temperature of step (a), and withdrawing therefrom a purge gas effluent enriched in the desorbed condensable component, wherein during sequential time periods (c1) at least a portion of the purge gas effluent is cooled and combined with the feed gas mixture passing to the second adsorbent bed in step (b), and then (c2) concurrently a first portion of the purge gas effluent is cooled to yield a cooled purge gas effluent; a second portion of the purge gas effluent is cooled to a temperature sufficient to condense substantially all of the condensable component present therein and the resulting condensate is separated from the resulting cooled noncondensable gas; and the cooled purge gas effluent is combined with the feed gas mixture to yield a total feed mixture which is passed to the second bed in step (b);

(d) discontinuing the flow of purge gas through the first adsorbent bed;

(e) cooling the first adsorbent bed; and (f) repeating steps (a) through (e).

2. The method of claim 1 which further comprises, following step (c2), either (c3) cooling at least a portion of the purge gas effluent to a temperature sufficient to condense substantially all of the condensable component present therein, and separating the resulting condensate from the resulting cooled noncondensable gas; or (c4) cooling at least a portion of the purge gas effluent and combining the resulting cooled purge gas effluent and the feed gas mixture to yield a total feed mixture which is passed to the second adsorbent bed in step (b).

3. The method of claim 2 which further comprises combining the resulting cooled noncondensable gas of step (c3) with the cooled purge gas effluent and the feed gas mixture to yield a total feed mixture which is passed to the second adsorbent bed in step (b).

4. The method of claim 2 wherein sequential steps (a), (c), (d), and (e) are carried out concurrently with passing the feed gas mixture through the second adsorbent bed in step (b).

5. The method of claim 2 wherein the sequential time period of step (c2) is defined as that period of time during desorption step (c) in which the concentration of the desorbed condensable component in the purge gas effluent reaches a maximum value.

6. The method of claim 5 wherein the sequential time period of step (c1) is defined as that period of time in which the concentration of the desorbed condensable component in the purge gas effluent is less than the concentration of the desorbed condensable component in the purge gas effluent at any time during sequential time period (c2), wherein step (c1) precedes step (c2).

7. The method of claim 6 wherein the sequential time period of alternative steps (c3) and (c4) is defined as that period of time during desorption step (c) in which the concentration of the desorbed condensable component in the purge gas effluent is less than the concentration of the desorbed condensable component in the purge gas effluent at any time during sequential time period (c2), wherein step (c2) precedes alternative steps (c3) and (c4).

8. The method of claim 1 which further comprises combining the resulting cooled noncondensable gas of step (c2) with the cooled purge gas effluent and the feed gas mixture to yield a total feed mixture which is passed to the second absorbent bed in step (b).

9. The method of claim 1 wherein in step (c2) the molar flow ratio of the first portion of the purge gas effluent to the second portion of the purge gas effluent is between about 0.1 and about 0.9.

10. The method of claim 1 wherein in step (c2) the ratio of the molar concentration of the condensable component in the total feed mixture to the molar concentration of the condensable component in the feed gas mixture is greater than about 1.5.

11. The method of claim 1 wherein at least a portion of the purge gas to the first adsorbent bed in step (c) is provided by a portion of the high purity noncondensable component product from the second adsorbent bed in step (b).

12. The method of claim 1 wherein during purge step (c) the first adsorbent bed is heated to a temperature above the adsorption temperature by heating the purge gas prior to introduction into the first adsorbent bed.

13. The method of claim 1 which further comprises venting a portion of the purge gas effluent to the atmosphere during sequential time period (c1).

14. The method of claim 1 wherein the purging of the first adsorbent bed in step (c) is carried out in a flow direction countercurrent to that of the feed gas mixture in step (a).

15. The method of claim 1 wherein the cooling of the first adsorbent bed in step (e) is accomplished by passing therethrough a portion of the high purity noncondensable component product of step (a).

16. The method of claim 15 wherein the high purity noncondensable component product used for cooling flows in a direction countercurrent to that of the feed gas mixture in step (a).

17. In a process for the recovery of a condensable component present at low concentration from a feed gas mixture containing the condensable component and a noncondensable component, wherein the condensable component is selectively adsorbed from the feed gas mixture in an adsorption step, the resulting adsorbed condensable component is desorbed by a heated purge gas in a regeneration step to yield a purge gas effluent enriched in desorbed condensable component, and the purge gas effluent is cooled to condense and recover the condensable component as a liquid, the improvement which comprises, during a time period of the regeneration step in which the concentration of the condensable component in the purge gas effluent reaches a maximum value, the steps of:

(a) dividing the purge gas effluent into a first and a second portion;

(b) cooling the first portion of the purge gas effluent to a temperature sufficient to condense substantially all of the condensable component present therein and recovering the resulting condensate therefrom; and concurrently (c) cooling the second portion of the purge gas effluent and combining the resulting cooled gas stream with the feed gas mixture to yield a total feed mixture for the adsorption step.

18. The method of claim 17 wherein the molar flow ratio of the first portion of the purge gas effluent to the second portion of the purge gas effluent is between about 0.1 and about 0.9.

19. The method of claim 18 wherein the ratio of the molar concentration of the condensable component in the total feed mixture to the molar concentration of the condensable component in the feed gas mixture is greater than about 1.5.

* * * * *